(12) United States Patent
Belgum

(10) Patent No.: US 8,988,779 B2
(45) Date of Patent: Mar. 24, 2015

(54) SYSTEM AND METHOD FOR COMBINING LIGHT BEAMS

(71) Applicant: Sutter Instrument Company, Novato, CA (US)

(72) Inventor: Jack H. Belgum, San Anselmo, CA (US)

(73) Assignee: Sutter Instrument Company, Novato, CA (US)

( * ) Notice: Subject to any disclaimer, the term of this patent is extended or adjusted under 35 U.S.C. 154(b) by 75 days.

(21) Appl. No.: 13/715,727

(22) Filed: Dec. 14, 2012

(65) Prior Publication Data

US 2014/0168785 A1     Jun. 19, 2014

(51) Int. Cl.
*G02B 27/14* (2006.01)

(52) U.S. Cl.
CPC ..................... *G02B 27/14* (2013.01)
USPC ........................................ 359/634

(58) Field of Classification Search
CPC ... G02B 27/10; G02B 27/141; G02B 27/1006
USPC ........................................ 359/634
See application file for complete search history.

(56) References Cited

U.S. PATENT DOCUMENTS

| 7,129,505 B2 | 10/2006 | Oostman, Jr. et al. |
| 2009/0040754 A1* | 2/2009 | Brukilacchio et al. ........ 362/228 |
| 2014/0036364 A1 | 2/2014 | Doric |

OTHER PUBLICATIONS

Euler, Thomas et al., *Eyecup Scope—Optical Recordings of Light Stimulus—Evoked Fluorescence Signals in the Retina*, Instruments and Techniques, Oct. 15, 2008, Springerlink.com, 22 pages.
Margrie, Troy W. et al., *Targeted Whole-Cell Recordings In The Mammalian Brain in Vivo*, Neuron, vol. 39, 911-918, Sep. 11, 2003, Copyright © 2003 by Cell Press, 8 pages.

* cited by examiner

*Primary Examiner* — James Jones
(74) *Attorney, Agent, or Firm* — Kilpatrick Townsend & Stockton LLP

(57) ABSTRACT

An optical system and method for combining multiple beams along a single light path is disclosed. In a preferred embodiment, a plurality of bandpass filters are arranged about the sides of a regular pentagon, the band pass filters being reflective of light wavelengths outside of the bandpass range. A plurality of light sources are positioned such that light from a source passes through an associated bandpass filter, preferably at an angle of about 18°. Light from the first light source passes out of the pentagonal housing after passing through the filter. Light from the other light sources are reflected off of the interior surfaces filters so as to combine with the light from the first light source.

10 Claims, 3 Drawing Sheets

SYSTEM AND METHOD FOR COMBINING LIGHT BEAMS

FIELD OF THE INVENTION

The present invention relates to an optical system and method, and particularly relates to a system and method for combining multiple light beams.

BACKGROUND

In scientific research, as well as in other applications, it is often desired to use multiple light sources in conducting an experiment. Multiple sources may be used either in combination in a common output beam or sequentially at different times during a research investigation (e.g., during the course of one or more experiments). The output beam can be used, for example, to illuminate an object of interest, such as a biological specimen or other object undergoing examination in a microscope. For example, two beams, each with a specific wavelength, may be simultaneously combined and used to cause excitation of specific molecules (such as florescent dyes). Beams along a common output path may be used sequentially, for example, first to set up an experiment with white light, and thereafter to use a specific light wavelength to cause an excitation. As used herein, the term "light" is intended to have broad meaning and to encompass not only visible light but also infrared and ultraviolet light. Likewise, as used herein, the term "white light" is intended to have broad meaning.

Where multiple beams are used at different times during the investigation, it is convenient for the research setup to enable the multiple beams to use a single output beam path so that it is not necessary to reconfigure the optical hardware each time a different light source is used. As used herein, the term combining beams is intended to refer to providing a common output beam path that can be used for multiple light sources either simultaneously or sequentially.

There are various sources of light, such as arc lamps, flash lamps, lasers, light emitting diodes (referred to herein as "LED's"), each of which has advantages and disadvantages in terms of power, spectral characteristics, ability to rapidly pulse, stability, etc. In many instances no one type of source provides all of the advantages that could be obtained by combining multiple sources. With improvements in LED technology, LED lamps have become increasingly useful and popular, such that there are now many specific wavelength LEDs available to the researcher. However, gaps remain in the spectrum of available LED sources, and it is often desirable to combine LEDs to obtain a desired "color." With currently available technology, for example, white light can be made by combining three LED wavelengths (red, green and blue), and such white light may be superior for use in specific applications to the light from a "white" LED. (A "white" LED can comprise either three colored LEDs in one package or a blue LED with a phosphor excited by the blue LED, in which case some of the blue leaks through to phosphor to extend the spectral coverage. In either case the spectral output is non-uniform.)

In some cases, such as in optical microscopy systems, it is known to use moveable mirrors to switch between light sources. However, this does not allow very rapid changing of the light source, and is difficult to adapt for more than two sources of light. When multiple light sources are restricted to wavelengths that do not overlap, it is possible to combine beams efficiently using dichroic mirrors. Characteristically, dichroic mirrors reflect light above a specific wavelength while transmitting light below the specific wavelength. FIG. 1 depicts a dichroic ladder, as is known in the art, for combining multiple light beams.

FIG. 1 shows four light sources, $10a$, $10b$, $10c$, and $10d$, each of which has associated optics to collimate the light from the source into a beam, and three dichroic mirrors, $20a$, $20b$ and $20c$. The dichroic mirrors are positioned at an angle of 45° relative to the collimated beams from the light sources. First light source $10a$ is selected to have a wavelength which passes directly through all of the dichroic mirrors, thereby defining a combined output beam axis 5. (As shown in FIG. 1, this beam is at a right angle relative to the beams from the other light sources.) The beam from the second light source $10b$ has a wavelength which is reflected by dichroic mirror $20a$ along beam axis 5. After being reflected by mirror $20a$, light from source $10b$ passes through the remaining mirrors $20b$ and $20c$. Similarly, light from sources $10c$ and $10d$ are reflected by mirrors $20b$ and $20c$, respectively, along axis 5, with the light from source $10c$ passing through mirror $20c$. In this manner, beams from multiple sources may be combined and directed along an axis to an output (not shown).

Mirrors $20a$-$20c$ must be carefully selected and installed in the proper positions in order to allow each of the light sources to be effectively delivered to the output. In order to reconfigure the system to use different light sources, it is often necessary to reposition several of the dichroic mirrors 20 and light sources 10. Moreover, dichroic mirrors are not useful for transmitting white light since they inherently reflect all light below a cut-off frequency.

The use of interference gratings that allow only transmission of a very narrow band of light wavelengths is a well known method of filtering light. Such filters may be referred to as bandpass filters. Typically, white light is filtered to produce the desired wavelength for illuminating the object under investigation. It was common practice to combine an interference filter in series with an absorbing colored glass filter in order to improve rejection outside the desired bandpass. Advances in coating technology have allowed filters with only interference layers to achieve the same level of rejection, often with much higher transmission within the bandpass.

Bandpass filters typically reflect any light that falls out of the bandpass range. Specifically, available bandpass filters typically reflect as much as 95% of the incident light that falls outside of the narrow bandpass range, effectively acting as a mirror in respect to such wavelengths. This property could be used to combine two beams in a simplified system similar to that depicted in FIG. 1, where a single bandpass filter is used instead of a dichroic mirror. However, because of the nature of bandpass filters, no more than two beams can be combined in this manner—one with a narrow band which passes through the filter and a second which is reflected off of the filter. Moreover, usually it is best to use bandpass filters at far less than 45°, and so a tilt at this angle would not be preferred.

In many research applications, the object under investigation is very small, such that a microscope is necessary to conduct the desired experiment or procedure. In such cases, and in others, space is at a premium and it is desirable to make the various hardware systems used to conduct the investigation as compact as possible. Such hardware systems may include, for example, optical systems for illuminating a specimen, mechanical systems such as micromanipulators and the like to position the specimen, microscopy systems and probe systems for observing and making measurements of the specimen, recording systems for acquiring data and images, and control systems for operating and coordinating the hardware.

Filter wheels, useful in many applications, are well known. Basically, a filter wheel comprises a plurality of optical filters mounted on a disc-shaped "wheel" that is rotatable about a central axis. By rotating the wheel any of the filters can be positioned by the user in the light path, thereby allowing the user to select (from among the filters) the wavelength of light used to illuminate the specimen. Such filters wheels are available, for example, from Sutter Instrument Company of Novato, Calif., (www.sutter.com) assignee of the present invention.

Recently, the assignee of the present invention has developed a filter wheel incorporating filters, wherein at least one, and preferable all, of the filters on the wheel are tunable. A filter wheel using tunable bandpass filters is disclosed in the assignee's U.S. application patent Ser. No. 13/162,904, the disclosure of which is incorporated by reference.

Quite often the same microscope is used in connection with experiments involving more than one illumination and/or emission wavelength, either during a single experiment or in different experiments. Moreover, in many research applications it is beneficial to use a narrow band of filtered light at some times, while at other times illuminating the object with white light. For example, the object undergoing microscopic examination may be illuminated with white (unfiltered) light when manipulating, preparing or handling the object and, thereafter, filtered to illuminate it with one or more selected frequencies to cause characteristic emissions. As noted above, however, the space used for the investigation may be very limited, making it difficult to place and remove filters. In order to enable an experiment to proceed efficiently, it is often desirable to quickly adjust the characteristics of the illuminating beam.

SUMMARY OF THE INVENTION

In one aspect the present invention is directed to an optical system for combining a plurality of light beams along a single light path, comprising a first source of collimated light, a first bandpass filter positioned in the path of light from the first light source, the distal surface of the first filter being reflective to light frequencies outside the bandpass range of the first filter, such that light from the first light source passes through said filter at an angle θ, where θ is between 10 and 80 degrees, a second source of collimated light, a second filter positioned in the path of light from the second light source, such that light from the second light source passes through said filter, wherein the first filter is positioned such that light from the second light source is incident on the distal surface substantially at the location at which light from the first light source passes through the first filter, and such that the incident light from the second light source is reflected at said angle θ, whereby light from the first and second light sources are combined into a single beam. In a further aspect, the second filter is a bandpass filter, and the distal surface of the second filter is reflective to light frequencies outside the bandpass range of the second filter, and the second filter is positioned relative to said second light source such that light from the second light source passes through said filter at the angle θ, and further comprises a third source of collimated light, a third filter positioned in the path of light from the third light source, such that light from the third light source passes through the third filter, and wherein the second filter is positioned such that light from the third light source is incident on the distal surface of the second filter substantially at the location at which light from the second light source passes through the second filter, and such the incident light from the third light source is reflected at the angle θ, whereby light from the first, second and third light sources are combined into a single beam.

In yet a further aspect the third filter is a bandpass filter, the distal surface of the third filter is reflective to light frequencies outside the bandpass range of the third filter, and the third filter is positioned relative to the third light source such that light from the third light source passes through the filter at the angle θ, and further comprising, a fourth source of collimated light, and a fourth filter positioned in the path of light from the fourth light source, such that light from the fourth light source passes through said fourth filter, and wherein the third filter is positioned such that light from the fourth light source is incident on the distal surface of the third filter substantially at the location at which light from the third light source passes through the third filter, and such said incident light from the fourth light source is reflected at the angle θ, whereby light from the first, second, third and fourth light sources are combined into a single beam. The first and second light sources may be light emitting diodes. The angle θ is preferably between 15 and 25 degrees and more preferably is about 18 degrees. In one embodiment, the first, second and third filters are positioned on three sides of a regular pentagon. In another embodiment, the third filter is a rotatable variable bandpass filter.

In yet another aspect, the present invention is directed to an optical system for combining a plurality of light beams, comprising, first, second and third sources of collimated light, a pentagonal filter array comprising at least three filters, each of the filters is positioned at a side of a regular pentagon and has a reflective interior surface, the filters being arranged such that collimated light from the first light source passes through the first filter at an angle θ, and passes out of the filter array without further reflection, collimated light from the second light source passes through the second filter and is incident on and reflected by the interior surface of the first filter at substantially the location where light from the first light source passes through the first filter, wherein the angle of reflection is θ, collimated light from the third light source passes through the third filter and is incident on and reflected by the interior surface of the second filter at substantially the location where light from the second light source passes through the second filter, wherein the angle of reflection is θ, whereby light from the first, second and third light sources exits the optical system along a common light path. Preferably, the angle θ is about 18 degrees.

The present invention is further directed to a method of combining a plurality of light beams, comprising passing a first collimated light beam at an angle θ through a filter having a reflective surface, passing a second collimated light beam at an angle θ through a second filter having a reflective surface, where the first and second filters are positioned such that the second collimated light beam, after passing through the second filter, is incident on and reflected by the first filter at an angle θ at substantially the same location where the first light beam passes through the first filter, passing a third collimated light beam at an angle θ through a third filter, where the second and third filters are positioned such that the third collimated light beam, after passing through the second filter, is incident on and reflected by the second filter at an angle θ at substantially the same location where the second light beam passes through the second filter, such that the first, second and third collimated light beams are combined.

DETAILED DESCRIPTION

The present invention is generally related to an apparatus and method for combining multiple light beams along a single path. A variety of light sources are useful in scientific investigations, and specifically in microscopy, including, without limitation, LEDs, Xenon arc lamps and lasers. Each of these light sources has its own set of advantages and disadvantages. For example, LEDs are inexpensive and can be modulated at high frequencies, but are not available with adequate output power for all useful wavelengths. One can combine multiple LEDs, each with different output spectra, to produce a broader spectrum, "white light" LED. In such instances, the contribution of each LED may be adjustable. Bandpass filters can then be used with these "white-light" LEDs to provide an output spectrum that is determined by the filter(s).

Xenon arc lamps offer a wide range of wavelengths with substantial power, but they are more expensive and their output is difficult to modulate. Moreover, output power is often not stable and the life of the bulbs is not as long as LEDs. A Xenon lamp can provide broad-band light or can be filtered to provide light within a chosen band-pass.

There are many applications where lasers are highly useful, but laser illumination is not suitable for most wide-field microscopy. Lasers are used for scanning microscopes and for photo activation of specific targets, such as florescent dyes or markers.

Combining a laser beam with light from a wider beam source, such as an arc lamp or LED, allows for wide field observation.

The present invention is directed to a system and method for using light from a variety of sources along a single light path, such that multiple beams can be used to illuminate an object of interest. As noted above, as used herein the term "combining beams" is used to refer to providing a single output beam path for multiple light sources, such that beams from the different sources may be used to illuminate the object either simultaneously or sequentially.

Figure 1:
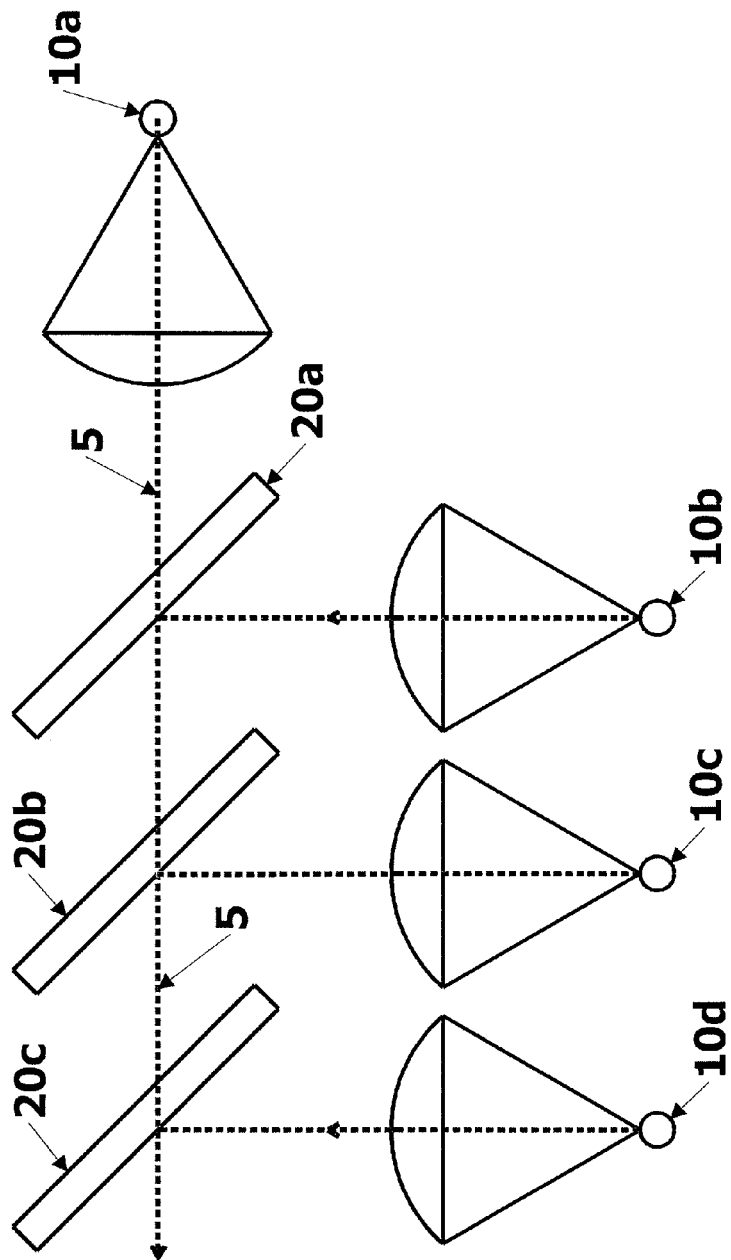
FIG. 1 is schematic diagram of a dichroic ladder as known in the prior art.
Figure 2:
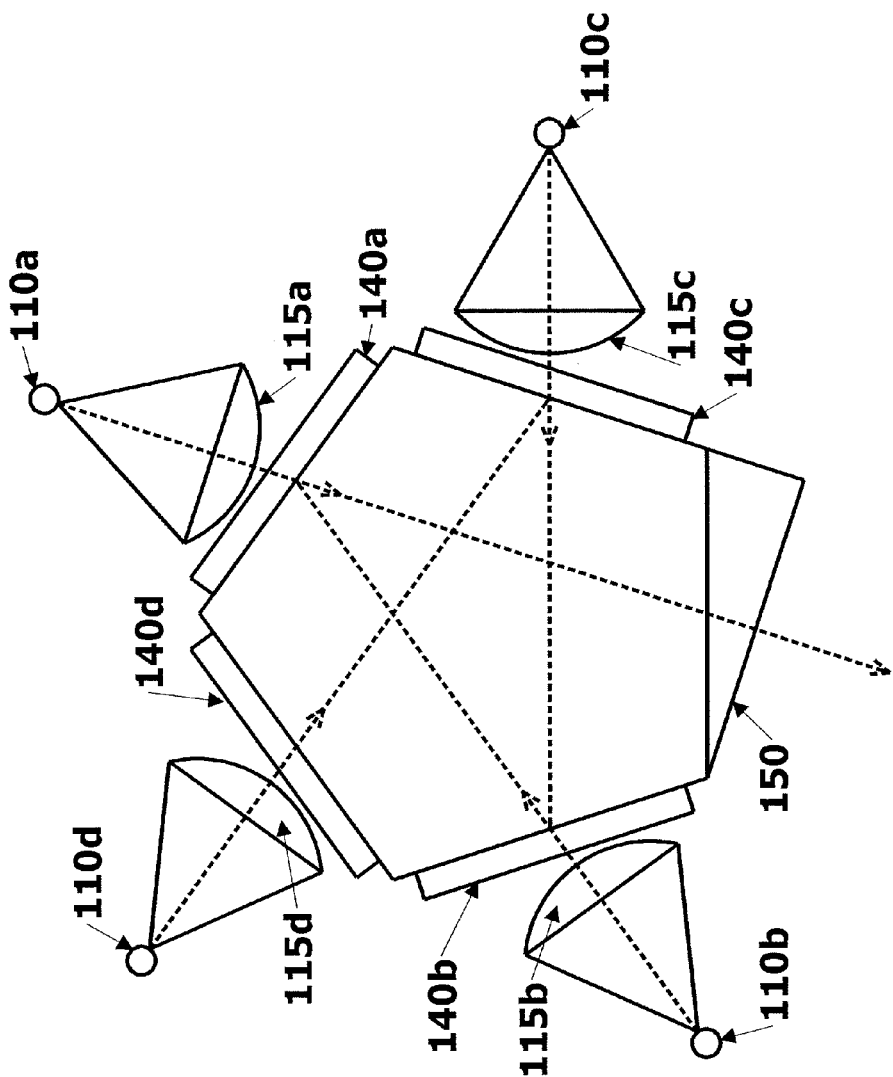
FIG. 2 is a schematic diagram of a beam combining apparatus of the present invention.

FIG. 2 is a schematic diagram of an apparatus 100 of the present invention for combining light beams from up to four sources. The light sources, which will generically be identifies as light sources 110, may be of various kinds, including, for example, arc lamps, flash lamps, lasers, and LEDs. Each of light sources 110a, 110b, 110c and 110d, may have collimating optics 115 associated therewith for creating a collimated beam of light, which may be 20 mm in diameter or more. Generally, however, because lasers emit a narrow bean of coherent light, they do not require additional optical elements for collimation. Accordingly, light sources 110 may have broad (e.g., an arc lamp) or narrow (e.g., a laser) emission bands.

In the exemplary embodiment depicted, there are four bandpass filters 140a, 140b, 140c and 140d, arranged about the sides of a regular pentagon, such that there is a filter 140 associated with each light source 110. In the embodiment depicted, the fifth side of the pentagon does not have any filter, and serves as the output 150, as described below.

The light beam from first light source 110a passes through the center of filter 140a and then directly to output 150 where is may be used to illuminate an object undergoing investigation, such as in a microscopy system. The light beam from second light source 110b passes through filter 140b, travels towards the center of filter 140a where it is reflected towards the output. Thus, the filtered beam from source 110b combines with the filtered beam from source 110a, i.e., it uses the same output light path. Similarly, the light beam from third light source 110c passes through filter 140c and travels to filter 140b, where it is reflected. The reflected beam thereafter travels to filter 140a where it is again reflected towards output 150. Thus, the beam from light source 110c combines with the beams from 110b and, thereafter 110a. Finally, the beam from fourth light source 110d passes through filter 140d, reflects off of filters 140c, 140b and 140a, and the filtered light combines with the other beams before exiting via output 150.

Each of the light beams is tilted by 72° relative to the plane of its associated filter when using a regular pentagonal arrangement. Generally, commercially available bandpass filters are designed such that it is optimal for a light beam to be incident normal to the plane of the filter (i.e., 90°), and using a different angle will cause some shift in the band pass range. Thus, in the depicted embodiment the angle of incidence is 18° off from what would generally be considered optimal. As a practical matter it has been determined that the relatively small (18°) shift in the angle of incidence provides satisfactory performance using commercially available bandpass filters if correction is made for the shift in bandpass when selecting the filters. Ideally, filters could be designed to be optimized for this application, i.e., for use at an 18° angle.

Note that the light beam from first light source 110a passes directly from its associated filter 140a to output 150 without being reflected. This position might be preferred for the light source that is most critical or which has the least power. While bandpass filters generally have a very high reflectance (e.g., ~95%) for frequencies outside the bandpass range, there is some loss of power which is compounded by multiple reflections.

Further note that filter 140d is not used to reflect light from any other sources. Thus, this filter could be omitted if a broadband or white light source were desired. As noted above, in many experiments white light is useful for illuminating the object being observed while it is manipulated, measured, photographed or otherwise being readied for an experiment. It will be understood that any light in the bandpass range of a filter will pass through the filter rather than being reflected and, thus, not all of the white light will be reflected. Nonetheless, despite missing one or more narrow frequency bands, the light will appear and function as white light for most practical purposes. In such instances the reflecting filter, by allowing certain frequencies to pass through it, effectively acts as a band rejection filter. This could have useful application where it is desired to illuminate an object with white light that is missing certain frequencies, such as those that would cause an undesired excitation or florescence.

It is also noted that if there are fewer than four light sources to be combined in a particular investigation, it is preferable to use the positions that require the least number of reflections.

Moreover, since filter 140d is not used for reflection, its angle may be variable, i.e., this filter need not be positioned to coincide with the side of a pentagon. Recently, bandpass filters have been developed that are tunable over a broad range of angles without substantial loss of the desired bandpass properties. Hence, these newly developed filters are "tunable" over a substantial range of wavelengths by changing the angle of incident light. Such filters remain useful at angles of up to 60 degrees relative to the light path. In accordance with another aspect of the present invention, filter 140d may be a rotatable tunable bandpass filter, such that the wavelengths from source 110*d* can be adjusted over a selected range according to the filter chosen. Alternatively, space permitting, a filter wheel or other filter changing apparatus could be used in lieu of filter 140*d*, thereby enabling greater flexibility in selecting the wavelength band used for illumination.

While the embodiment depicted in FIG. 2 shows, for illustrative purposes, four light beams being combined simultaneously, it may be desired to have different beams "on" at different times. This may be accomplished by simply turning the light sources on and off, as needed, or by using shutters between the light source and the associated filter. Some light sources can be turned on and off very rapidly, while others can take substantial time. Thus, whether to use switching or shutters is a matter of design choice depending on the nature of the light sources involved and the needs of the experiment.

Figure 3:
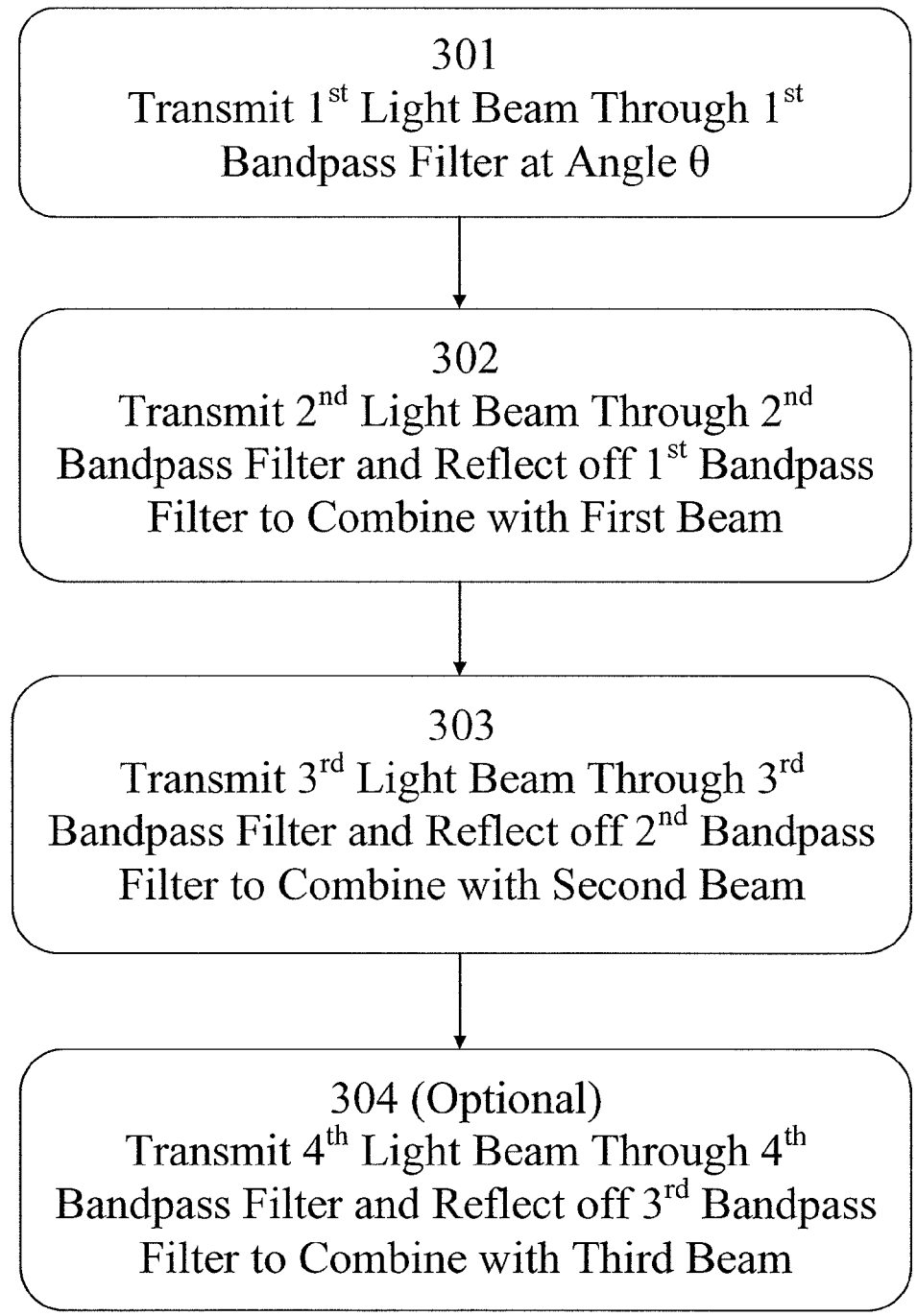
FIG. 3 is a flow chart depicting the steps of an embodiment of the method of the present invention.

The present invention further comprises a method of combining a plurality of light beams as depicted in the flow chart of FIG. 3. At step 301 a first collimated light beam is activated and passes at an angle $\theta$ through a first bandpass filter having a reflective surface to frequencies outside of the bandpass range. The angle $\theta$ is preferably between 10 and 80 degrees and more preferably between 15 and 25 degrees. In the preferred embodiment the angle is about 18 degrees. The filtered, first collimated light beam then propagates directly to an output, defining an output beam path.

At step 302 a second collimated light beam is activated and passes at an angle through a second bandpass filter having a reflective surface. The first and second bandpass filters are positioned relative to each other such that the second collimated light beam, after passing through the second filter, is incident on and reflected by the first filter at an angle $\theta$ at substantially the same location where the first light beam passes through the first filter. After passing through the second filter and being reflected by the first filter, light from the second collimated light source combines with and follows the same path to the output as the first collimated light beam.

At step 303 a third collimated light beam is activated and passes at an angle through a third filter. The first, second and third filters are positioned such that the third collimated light beam, after passing through the third filter, is incident on and reflected by the second filter at an angle $\theta$ at substantially the same location where the second light beam passes through the second filter, such that the first, second and third collimated light beams are combined.

At optional step 304 a fourth collimated light beam is activated and is incident on and reflected off of the third filter at an angle $\theta$ at substantially the same location where the third light beam passes through the third filter, such that the first, second, third and fourth collimated light beams are combined.

The embodiments described above are illustrative of the present invention and are not intended to limit the scope of the invention to the particular embodiments described. Accordingly, while one or more embodiments of the invention have been illustrated and described, it will be appreciated that various changes can be made therein without departing from the spirit or essential characteristics thereof. Accordingly, the disclosures and descriptions herein are intended to be illustrative, but not limiting, of the scope of the invention, which is set forth in the following claims.

I claim:

1. An optical system for combining a plurality of light beams along a single light path, comprising:
   a first source of collimated light;
   a first bandpass filter positioned in the path of light from said first light source, the distal surface of said first filter being reflective to light frequencies outside the bandpass range of said first filter, such that light from said first light source passes through said first filter at an angle $\theta$, where said angle $\theta$ is between 15 and 25 degrees;
   a second source of collimated light; and
   a second filter positioned in the path of light from said second light source, such that light from said second light source passes through said second filter;
   wherein said first filter is positioned such that light from said second light source is incident on said distal surface substantially at the location at which light from said first light source passes through said first filter, and such said incident light from said second light source is reflected at said angle $\theta$, whereby light from said first and second light sources are combined into a single beam.

2. The optical system of claim 1, wherein said first and second light sources are light emitting diodes.

3. An optical system for combining a plurality of light beams along a single light path, comprising:
   a first source of collimated light;
   a first bandpass filter positioned in the path of light from said first light source, the distal surface of said first filter being reflective to light frequencies outside the bandpass range of said first filter, such that light from said first light source passes through said first filter at an angle $\theta$, wherein said angle $\theta$ is about 18 degrees;
   a second source of collimated light;
   a second filter positioned in the path of light from said second light source, such that light; from said second light source passes through said second filter;
   wherein said first filter is positioned such that light from said second light source is incident on said distal surface substantially at the location at which light from said first light source passes through said first filter, and such said incident light from said second light source is reflected at said angle $\theta$, whereby light from said first and second light sources are combined into a single beam;
   wherein said second filter is a bandpass filter, the distal surface of said second filter being reflective to light frequencies outside the bandpass range of said second filter, and wherein said second filter is positioned relative to said second light source such that light from said second light source passes through said second filter at said angle $\theta$;
   a third source of collimated light;
   a third filter positioned in the path of light from said third light source, such that light from said third light source passes through said third filter;
   wherein said second filter is positioned such that light from said third light source is incident on said distal surface of said second filter substantially at the location at which light from said second light source passes through said second filter, and such said incident light from said third light source is reflected at said angle $\theta$, whereby light from said first, second and third light sources are combined into a single beam;
   wherein said third filter is a bandpass filter, the distal surface of third second filter being reflective to light frequencies outside the bandpass range of said third filter, and wherein said third filter is positioned relative to said third light source such that light from said third light source passes through said third filter at said angle $\theta$;
   a fourth source of collimated light;
   a fourth filter positioned in the path of light from said fourth light source, such that light from said fourth light source passes through said fourth filter;
   wherein said third filter is positioned such that light from said fourth light source is incident on said distal surface of said third filter substantially at the location at which light from said third light source passes through said third filter and such said incident light from said fourth light source is reflected at said angle θ, whereby light from said first, second, third and fourth light sources are combined into a single beam.

4. An optical system for combining a plurality of light beams along a single light path, comprising:
   a first source of collimated light;
   a first bandpass filter positioned in the path of light from said first light source, the distal surface of said first filter being reflective to light frequencies outside the bandpass range of said first filter such that light from said first light source passes through said first filter at an angle θ, where θ is between 10 and 80 degrees;
   a second source of collimated light;
   a second filter positioned in the path of light from said second light source, such that light from said second light source passes through said second filter;
   wherein said first filter is positioned such that light from said second light source is incident on said distal surface substantially at the location at which light from said first light source passes through said first filter, and such said incident light from said second light source is reflected at said angle θ, whereby light from said first and second light sources are combined into a single beam;
   wherein said second filter is a bandpass filter, the distal surface of said second filter being reflective to light frequencies outside the bandpass range of said second filter, and wherein said second filter is positioned relative to said second light source such that light from said second light source passes through said filter at said angle θ;
   a third source of collimated light;
   a third filter positioned in the path of light from said third light source, such that light from said third light source passes through said third filter;
   wherein said second filter is positioned such that light from said third light source is incident on said distal surface of said second filter substantially at the location at which light from said second light source passes through said second filter, and such said incident light from said third light source is reflected at said angle θ, whereby light from said first, second and third light sources are combined into a single beam;
   wherein said first, second and third filters are positioned on three sides of a regular pentagon.

5. An optical system for combining a plurality of light beams along a single light path, comprising:
   a first source of collimated light;
   a first bandpass filter positioned in the path of light from said first light source, the distal surface of said first filter being reflective to light frequencies outside the bandpass range of said first filter, such that light from said first light source passes through said first filter at an angle θ, θ is between 10 and 80 degrees;
   a second source of collimated light;
   a second filter positioned in the path of light from said second light source, such that light from said second light source passes through said second filter;
   wherein said first filter is positioned such that light from said second light source is incident on said distal surface substantially at the location at which light from said first light source passes through said first filter, and such said incident light from said second light source is reflected at said angle θ, whereby light from said first and second light sources are combined into a single beam;
   wherein said second filter is a bandpass filter, the distal surface of said second filter being reflective to light frequencies outside the bandpass range of said second filter, and wherein said second filter is positioned relative to said second light source such that light from said second light source passes through said second filter at said angle θ;
   a third source of collimated light;
   a third filter positioned in the path of light from said third light source, such that light from said third light source passes through said third filter;
   wherein said second filter is positioned such that light from said third light source is incident on said distal surface of said second filter substantially at the location at which light from said second light source passes through said second filter, and such said incident light from said third light source is reflected at said angle θ, whereby light from said first, second and third light sources are combined into a single beam;
   wherein said third filter is a bandpass filter, the distal surface of third second filter being reflective to light frequencies outside the bandpass range of said third filter, and wherein said third filter is positioned relative to said third light source such that light from said third light source passes through said third filter at said angle θ;
   a fourth source of collimated light;
   a fourth filter positioned in the path of light from said fourth light source, such that light from said fourth light source passes through said fourth filter;
   wherein said third filter is positioned such that light from said fourth light source is incident on said distal surface of said third filter substantially at the location at which light from said third light source passes through said third filter, and such said incident light from said fourth light source is reflected at said angle θ, whereby light from said first, second, third and fourth light sources are combined into a single beam;
   wherein said fourth filter is a rotatable variable bandpass filter.

6. An optical system for combining a plurality of light beams, comprising:
   first, second and third sources of collimated light;
   a pentagonal filter array comprising at least three filters, each of said filters positioned at a side of a regular pentagon and having a reflective interior surface;
   said filters being arranged such that:
     a) collimated light from said first light source passes through said first filter at an angle θ, wherein said angle θ is about 18 degrees, and passes out of the filter array without further reflection:
     b) collimated light from said second light source passes through said second filter and is incident on and reflected by the interior surface of said first filter at substantially the location where light from said first light source passes through said first filter, wherein the angle of reflection is θ;
     c) collimated light from said third light source passes through said third filter and is incident on and reflected by the interior surface of said second filter at substantially the location where light from said second light source passes through said second filter, wherein the angle of reflection is θ;
   whereby light from said first, second and third light sources exits said optical system along a common light path.

7. The optical system of claim 3, wherein said light sources are light emitting diodes.

8. The optical system of claim 4, wherein said light sources are light emitting diodes.

9. The optical system of claim 5, wherein said light sources are light emitting diodes.

10. The optical system of claim 6, wherein said light sources are light emitting diodes.

* * * * *